(12) United States Patent
Sugimoto

(10) Patent No.: US 9,906,070 B2
(45) Date of Patent: Feb. 27, 2018

(54) DISTRIBUTED POWER SOURCE SYSTEM WITH STORAGE BATTERY

(71) Applicant: TABUCHI ELECTRIC CO., LTD., Osaka-shi, Osaka (JP)

(72) Inventor: Hidehiko Sugimoto, Osaka (JP)

(73) Assignee: Tabuchi Electric Co., Ltd., Osaka (JP)

( * ) Notice: Subject to any disclaimer, the term of this patent is extended or adjusted under 35 U.S.C. 154(b) by 187 days.

(21) Appl. No.: 14/946,481

(22) Filed: Nov. 19, 2015

(65) Prior Publication Data

US 2016/0149413 A1   May 26, 2016

(30) Foreign Application Priority Data

Nov. 21, 2014 (JP) ................. 2014-236373

(51) Int. Cl.
*H02J 7/35* (2006.01)
*H02J 3/18* (2006.01)
*H02J 3/32* (2006.01)

(52) U.S. Cl.
CPC .............. *H02J 7/35* (2013.01); *H02J 3/1842* (2013.01); *H02J 3/32* (2013.01); *Y02E 40/22* (2013.01)

(58) Field of Classification Search
CPC .................................... H02J 3/1842
See application file for complete search history.

(56) References Cited

U.S. PATENT DOCUMENTS

| 7,872,375 B2 * | 1/2011 | Realmuto | H02J 1/10 307/80 |
| 8,941,263 B2 * | 1/2015 | Lee | H02J 3/32 307/140 |

FOREIGN PATENT DOCUMENTS

| JP | 10-248180 A | 9/1998 |
| JP | 2004-32831 A | 1/2004 |

* cited by examiner

*Primary Examiner* — Jeffrey Zweizig
(74) *Attorney, Agent, or Firm* — Birch, Stewart, Kolasch & Birch, LLP

(57) ABSTRACT

The present system 1 includes a distributed power source 2, a storage battery 4, a bidirectional inverter 7 having a smoothing capacitor 6 on its DC side, and a control section 10 for controlling the entire system, and supplies AC power to a load 9 while being interconnected with a power system 8. When active power supplied from the distributed power source 2 and/or the storage battery 4 to the smoothing capacitor 6 is equal to or greater than active power of load power, the control section 10 controls a power factor of inverter output current outputted from the bidirectional inverter 7 so as to coincide with a power factor of load current flowing to the load 9.

6 Claims, 5 Drawing Sheets

DISTRIBUTED POWER SOURCE SYSTEM WITH STORAGE BATTERY

CROSS REFERENCE TO THE RELATED APPLICATION

This application is based on and claims Convention priority to Japanese patent application No. 2014-236373, filed Nov. 21, 2014, the entire disclosure of which is herein incorporated by reference as a part of this application.

BACKGROUND OF THE INVENTION

Field of the Invention

The present invention relates to a distributed power source system with a storage battery, which charges the storage battery with DC power of a distributed power source such as a solar battery, and supplies AC power to a load while being interconnected with a commercial power system or power grid.

Description of Related Art

Conventionally, there is known a distributed power source system with a storage battery, which effectively utilizes power of a distributed power source such as a solar power while effectively using the storage battery. In this system, an inverter is provided for performing system interconnection for DC power of the solar battery, and it is known that, for example, in the case of a household load which includes a capacitive or inductive device, reactive power flowing from a power system to the load increases, and in order to reduce the reactive power, the inverter generates reactive power to perform reactive power compensation. Such examples include a power conversion apparatus in which an inverter generates power for compensating reactive power based on calculation of active power and reactive power of system power or grid power (for example, JP Laid-open Patent Publication No. H10-248180).

There is also known a system interconnection inverter apparatus in which, based on calculation of active power and reactive power of system power, change in a power factor of system current or grid current is detected, and reactive current generated by an inverter is increased or decreased, thereby performing control so that the reactive current does not flow from a power system to a load, thus compensating reactive power (for example, JP Laid-open Patent Publication No. 2004-32831).

DISCLOSURE OF THE INVENTION

For example, in the case where there are a plurality of loads including a load with a low power factor and a load with a high power factor, e.g., 1, it may be desired to detect and control only the former load. In the case where there are a load that needs to be supplied with power from a solar battery or a storage battery in a power outage state, and a load that need not be supplied with power in a power outage state, it may be desired to detect and control only the former load. However, in these cases, it may be impossible to perform swift and appropriate control for the load that needs to be controlled as described above, merely by detecting a power factor of system current as in conventional case.

In JP Laid-open Patent Publication No. 2004-32831, reactive power is compensated in accordance with change in a power factor of system current. However, immediately after power of the load has changed, inverter output current has not changed yet, and therefore reactive current is supplied from the power system, whereby change in the power factor of system current occurs. Thus, a difference occurs between the power factor of system current and a power factor of load current, and appropriate response to change in the power factor of load current cannot be attained. As a result, supply of power may become unstable.

An object of the present invention is to provide a distributed power source system with a storage battery, that is capable of, for a load that needs to be controlled, supplying stable power while swiftly and appropriately responding to change in a power factor of load current, and performing reactive power compensation.

In order to achieve the above object, a distributed power source system with a storage battery according to the present invention includes: a distributed power source; a storage battery; a bidirectional inverter having a smoothing capacitor on a DC side thereof and configured to perform bidirectional conversion between DC power outputted from the distributed power source and/or the storage battery, and AC power interconnected to a commercial power system; a unidirectional converter provided between the distributed power source and the bidirectional inverter and configured to perform DC conversion of DC power of the distributed power source; a bidirectional converter provided between the storage battery and the bidirectional inverter and configured to perform bidirectional DC conversion of DC power of the storage battery; and a control section configured to control an entire system. The distributed power source system with a storage battery supplies AC power to a load while being interconnected with the power system. The control section controls a power factor of inverter output current outputted from the bidirectional inverter so as to coincide with a power factor of load current flowing to the load, when active power supplied from the distributed power source and/or the storage battery to the smoothing capacitor is equal to or greater than active power of load power.

In this configuration, when active power supplied from the distributed power source and/or the storage battery to the smoothing capacitor is equal to or greater than active power of load power, a power factor of inverter output current outputted from the bidirectional inverter is controlled so as to coincide with a power factor of load current flowing to the load. Therefore, for a load that needs to be controlled, by causing the power factor of the inverter output current to coincide with the power factor of the load current, it becomes possible to supply stable power while swiftly and appropriately responding to change in the power factor of the load current, and compensate reactive current.

In the present invention, preferably, the control section includes: a target amplitude calculation unit configured to calculate a deviation between a voltage command value, and a DC voltage value detected at the smoothing capacitor and depending on active power of the distributed power source and/or the storage battery and on output power of the bidirectional inverter, and to generate a target amplitude for active current of the inverter output current outputted from the bidirectional inverter; and an inverter output current control unit configured to perform feedback control to make the active current of the inverter output current proportional to active current of the load current flowing to the load within the target amplitude.

In this configuration, the target amplitude for the active current of the inverter output current is generated based on DC voltage of the active power from the distributed power source and/or the storage battery, and the active current of the inverter output current is made proportional to the active current of the load current within the target amplitude. Therefore, for a load that needs to be controlled, it becomes possible to compensate reactive current while limiting harmonic current, and supply stable power while swiftly and appropriately responding to change in the active current of the load current.

In the present invention, preferably, when the active power from the distributed power source and/or the storage battery is smaller than the active power of the load power, the control section performs control so as to make active current of the inverter output current smaller than active current of the load current, and to make reactive current of the inverter output current equal to reactive current of the load current. In this case, it becomes possible to supply power that can be outputted by the bidirectional inverter, while compensating reactive current.

In the present invention, preferably, when a maximum value of an active current amplitude of the inverter output current can be caused to coincide with a maximum value of an active current amplitude of the load current, and DC power of the distributed power source is greater than active power of the load power so that surplus power is generated, the control section controls the bidirectional converter so as to charge the storage battery with the surplus power that can be charged therein. In this case, the storage battery can be charged with surplus power generated by the distributed power source, and thus the storage battery can be effectively used.

In the present invention, when the surplus power is generated, the control section may perform control so as to reversely flow DC power that can be reversely flowed to the power system. In this case, if the storage battery is charged up to a storage limit and surplus power is further left on the distributed power source side, the surplus power can be reversely flowed.

In the present invention, the distributed power source may be a single power source or a plurality of power sources, at least including a solar battery. In this case, comparatively stable DC power can be supplied from the solar battery.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
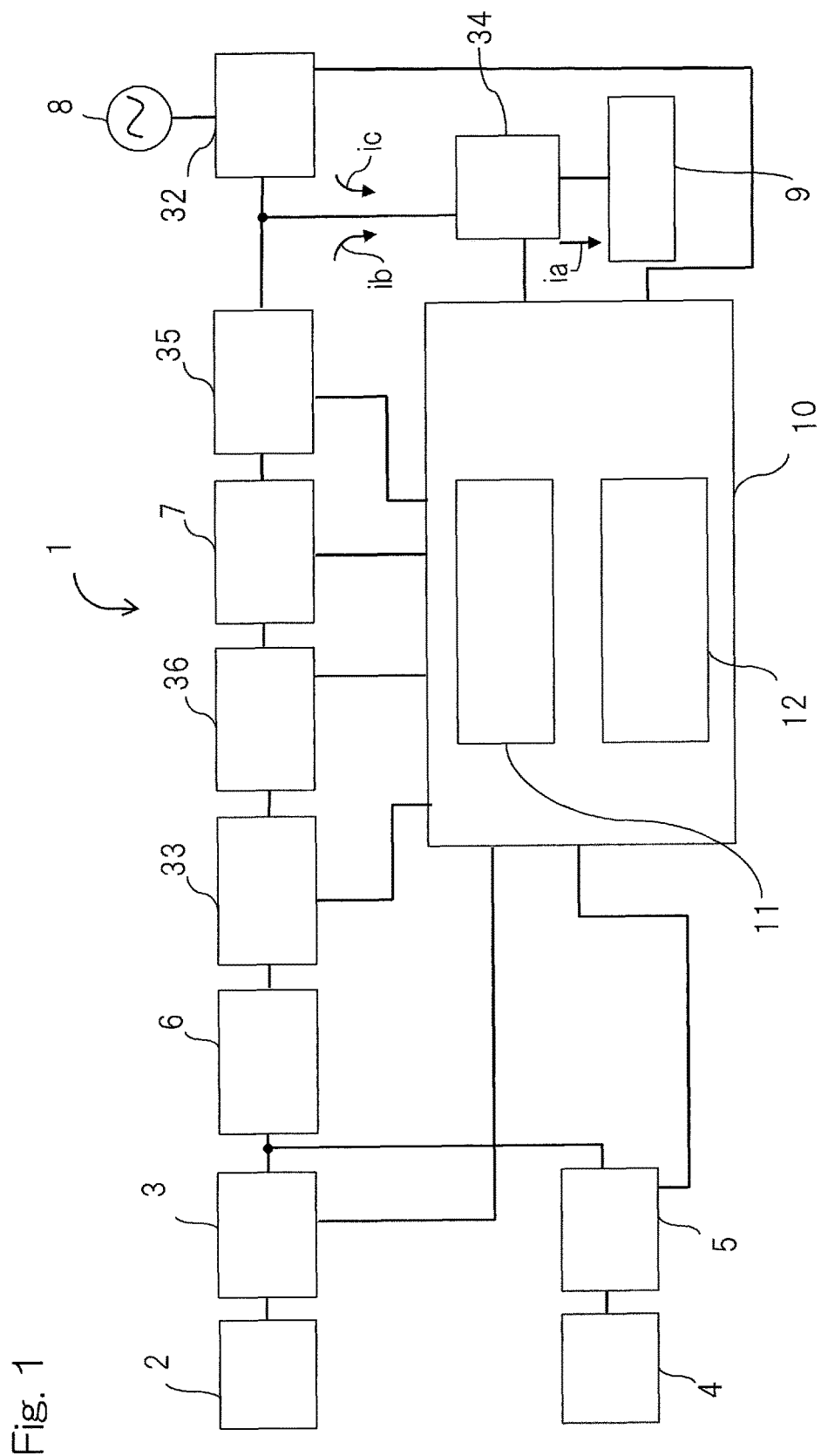
FIG. 1 is a block diagram showing a distributed power source system with a storage battery according to the first embodiment of the present invention.

Hereinafter, embodiments of the present invention will be described with reference to the drawings. FIG. 1 is a block diagram showing a distributed power source system 1 with a storage battery according to the first embodiment of the present invention. The distributed power source system 1 with a storage battery is to effectively utilize power of a distributed power source such as a solar battery while effectively using a storage battery, and is used for, for example, when a peak of power consumption is about to exceed an upper limit value, performing compensation by power stored in a storage battery, to perform peak cut.

The distributed power source system 1 in FIG. 1 includes: a distributed power source such as a solar battery 2; a unidirectional converter (DC/DC converter) 3 which performs DC conversion of DC power of the solar battery 2; a storage battery 4 which performs charging and discharging; a bidirectional converter (DC/DC converter) 5 which performs bidirectional DC conversion of DC power of the storage battery 4; a bidirectional inverter (DC/AC inverter) 7 which performs bidirectional conversion between DC power outputted from the solar battery 2 and the storage battery 4 via the respective converters 3 and 5, and commercial AC power interconnected to a commercial power system 8; and a control section 10 which controls the entire system. The distributed power source system 1 supplies AC power to a load 9 while being interconnected with the power system 8.

A smoothing capacitor 6 is connected on a DC side of the bidirectional inverter 7. A filter circuit 13 composed of, for example, a coil and a capacitor is connected on an AC side of the bidirectional inverter 7 (FIG. 2), whereby harmonic noise in inverter output current is eliminated.

When active power supplied from the solar battery 2 and the storage battery 4 to the smoothing capacitor 6 is equal to or greater than active power of the load power, the control section 10 controls a power factor of inverter output current ib outputted from the bidirectional inverter 7 so as to coincide with a power factor of load current ia flowing to the load 9. The control section 10 includes target amplitude calculation unit 11 and inverter output current control unit 12.

The target amplitude calculation unit 11 calculates a deviation between a DC voltage value (actual DC voltage value) of active power from the solar battery 2 and the storage battery 4, which is detected at the smoothing capacitor 6, and a voltage command value for generating AC voltage that can be supplied to the power system 8 and the load 9 provided in advance, and generates a target amplitude for the inverter output current ib outputted from the bidirectional inverter 7.

The inverter output current control unit 12 performs feedback control to cause active current ib1 of the inverter output current ib to be proportional to active current ia1 of the load current ia within the target amplitude (maximum value). Reactive current ib2 of the inverter output current ib is controlled so that the reactive current ib2 being the same as reactive current ia2 of the load current ia is outputted. System current is flows from the power system 8 to the load 9.

Here, coincidence between the power factor of the load current ia flowing to the load and the power factor of the inverter output current ib is as follows. The power factor of the load current ia is represented as cos(ia1/ia), where ia1 is active current of the load current ia, and ia2 is reactive current of the load current ia. The power factor of the inverter output current ib is represented as cos(ib1/ib), where ib1 is active current of the inverter output current ib, and ib2 is reactive current of the inverter output current ib. The coincidence unit causing these power factors to coincide with each other.

The control to cause the power factors to coincide with each other as mentioned herein is different from so-called "power factor constant control" in which, when DC power of a solar battery or the like is reversely flowed to a power system, reactive power is outputted with the power factor controlled to be a specified power factor in order to suppress voltage increase in the power system.

Figure 3:
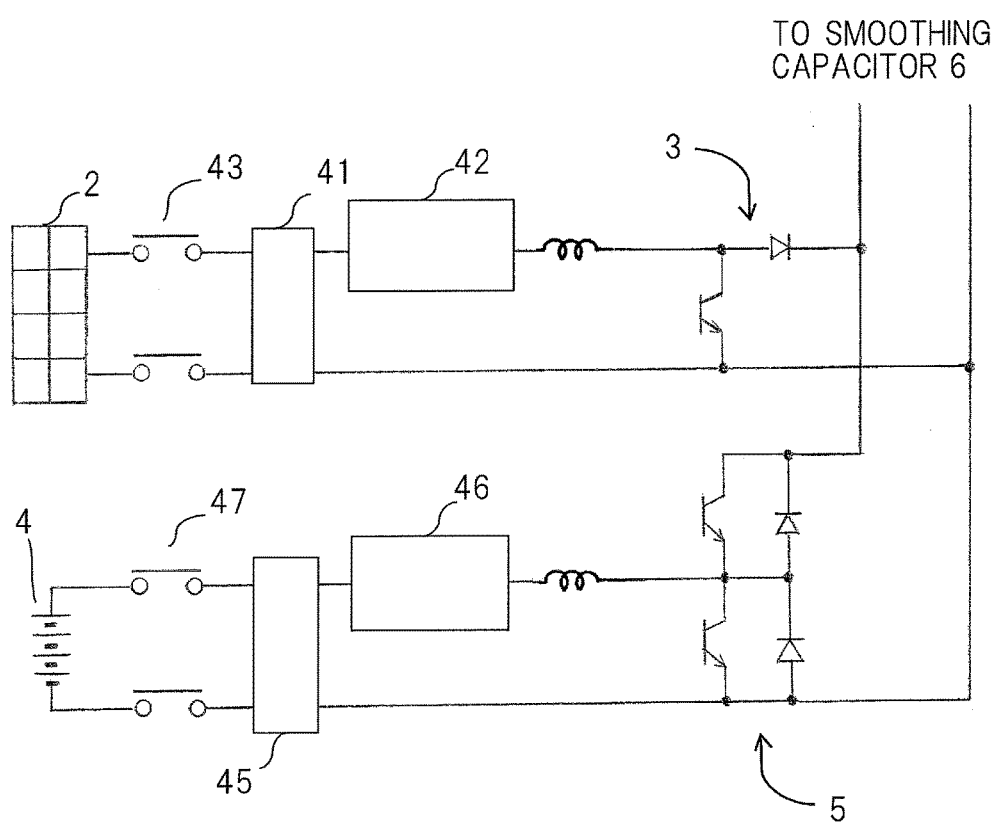
FIG. 3 is a partial detail diagram of FIG. 2.

As shown in FIG. 3, DC power of the solar battery 2 is detected by a voltage detector 41 and a current detector 42, and through control by the control section 10, the unidirectional converter 3 between the solar battery 2 and the bidirectional inverter 7 is selectively operated, and power generated by the solar battery 2 is controlled to be maximized (MTTP control). Between the solar battery 2 and the unidirectional converter 3, a solar battery switch 43 is provided for connecting or disconnecting the solar battery 2 and the unidirectional converter 3. Through control by the control section 10, the converter 3 converts power generated by the solar battery 2 to DC power having such a voltage level that allows power supply to the load 9 or reverse flow, and converts power generated by the solar battery 2 to DC power having such a voltage level that allows the power to be stored into the storage battery 4.

DC power of the storage battery 4 is detected by a voltage detector 45 and a current detector 46. Between the storage battery 4 and the bidirectional inverter 7, the bidirectional converter 5 is provided which performs bidirectional DC conversion of DC power of the storage battery 4. Between the storage battery 4 and the bidirectional converter 5, a storage battery switch 47 is provided for connecting or disconnecting the storage battery 4 and the bidirectional converter 5. Through control by the control section 10, in discharging, the bidirectional converter 5 converts the DC voltage level of DC power stored in the storage battery 4 to such a voltage level that allows discharging (power supply to the load 9 or reverse flow), thereby performing the discharging. In charging, the bidirectional converter 5 converts the DC voltage level of DC power from the solar battery 2 to such a voltage level that allows charging to the storage battery 4, thereby performing the charging.

In FIG. 1, provided are: a first voltage detector 32 which detects system voltage (load voltage); a second voltage detector 33 which is connected in parallel to the smoothing capacitor 6 and detects DC voltage outputted from the solar battery 2 and the storage battery 4; a first current detector 34 which detects the load current ia flowing to the load 9; a second current detector 35 which detects the output current ib of the bidirectional inverter 7; and a third current detector 36 which detects output current from the solar battery 2 and the storage battery 4.

The active power of power of the load 9, and the active current ia1 and the reactive current ia2 of the load current ia, can be detected by the first voltage detector 32 and the first current detector 34. The active power of the inverter output power, and the active current ib1 and the reactive current ib2 of the inverter output current ib, can be detected by the first voltage detector 32 and the second current detector 35. The DC power (active power) outputted from the solar battery 2 and the DC power (active power) discharged from the storage battery 4 can be detected by the second voltage detector 33 and the third current detector 36.

Figure 2:
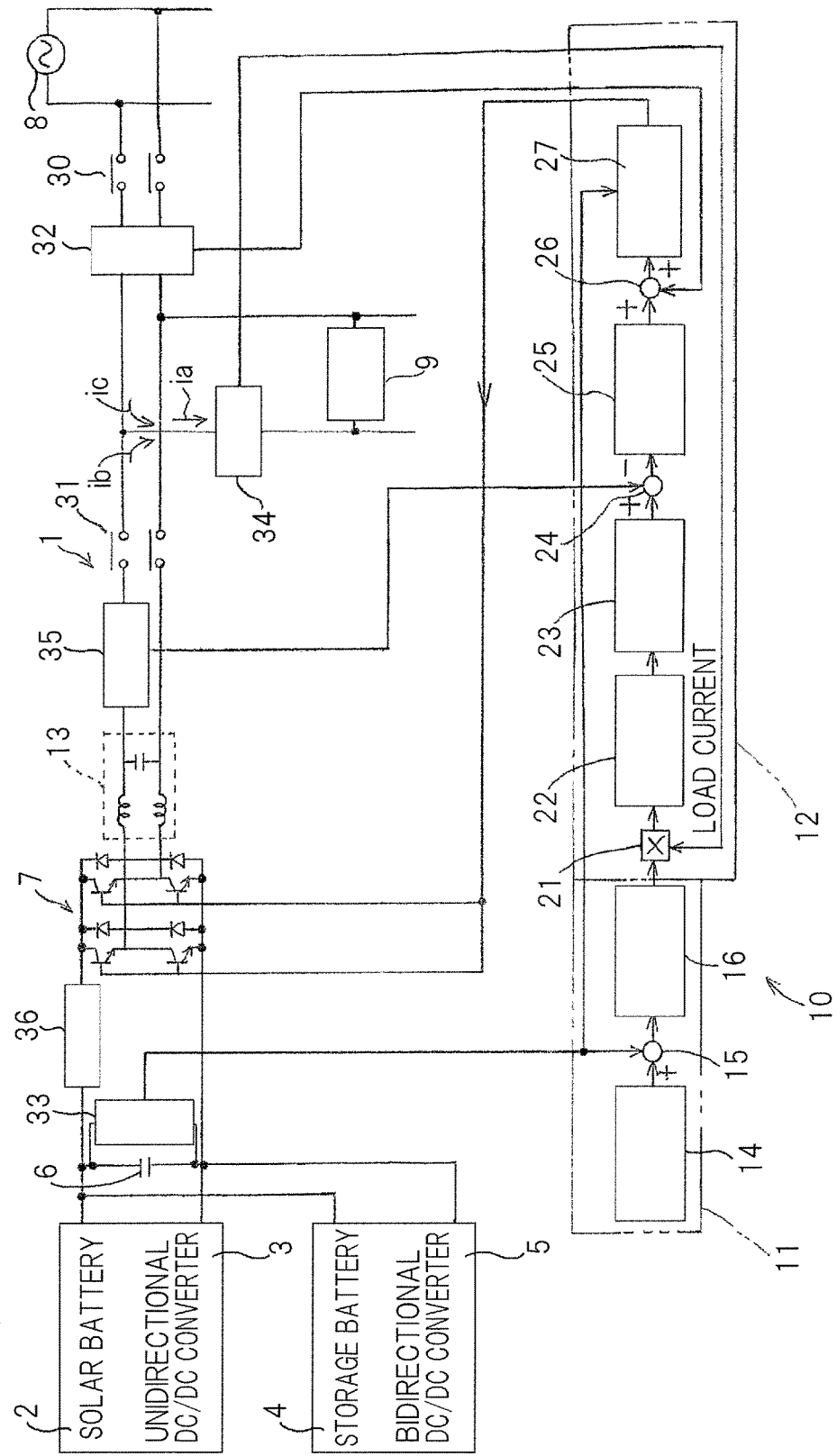
FIG. 2 is a circuit diagram showing the distributed power source system with a storage battery in FIG. 1.

In FIG. 2, an interconnection switch 30 is capable of connecting or disconnecting the power system 8 and the load 9, through control by the control section 10. The power system 8 and the load 9 are disconnected when purchase or sale of system power with the power system 8 is not performed. For example, in the case of disconnecting the power system 8 and supplying power to the load 9 from only the solar battery 2 or the like, the interconnection switch 30 is turned off. An inverter switch 31 is capable of connecting or disconnecting the bidirectional inverter 7 and the load 9, through control by the control section 10. For example, in the case of disconnecting the bidirectional inverter 7 and supplying power to the load 9 from only the power system 8, the inverter switch 31 is turned off.

The target amplitude calculation unit 11 of the control section 10 includes a capacitor voltage target value (voltage command value) section 14, a first subtractor 15, and a proportional integral element section 16. The inverter output current control unit 12 includes a multiplier 21, a limiter 22, an inverter output current target value section 23, a second subtractor 24, a current compensator 25, an adder 26, and a PWM signal generator 27.

In this example, DC power (active power) from the solar battery 2 and DC power (active power) discharged from the storage battery 4 are used. However, depending on a state of each DC power, one of DC power (active power) of the solar battery 2 and DC power (active power) of the storage battery 4 may be used.

First, in the target amplitude calculation unit 11, the first subtractor 15 subtracts a voltage target value (voltage command value) for the smoothing capacitor 6 from an actual DC voltage value (hereinafter, referred to as DC voltage of the solar battery and the like) of the solar battery 2 and the storage battery 4, detected by the second voltage detector 33, which is obtained as a result of DC voltage control and output control by the bidirectional inverter 7, i.e., which depends on output power of the bidirectional inverter 7. Based on a result of the subtraction, the proportional integral element section 16 outputs a calculation result for causing a deviation between the voltage target value and the DC voltage of the solar battery 2 and the like to approach zero, so that the DC voltage of the solar battery 2 and the like coincides with the voltage target value. Thus, a multiple of the active current ia1 of the load current ia is generated which is used for generating a target amplitude for the active current ib1 of the inverter output current ib and serves as a reference of AC voltage that can be supplied to the power system 8 and the load 9. As the proportional integral element section 16, for example, a PI controller is used.

Next, in the inverter output current control unit 12, output of the proportional integral element section 16 and the load current ia are multiplied by the multiplier 21. In this example, the amplitude of the active current ib1 of the inverter output current ib is made one-fold proportional to (i.e., equal to) the amplitude of the active current ia1 of the load current ia, and the reactive current ib2 of the inverter output current ib is made equal to the reactive current ia2 of the load current ia. The limiter 22 makes output current from the multiplier 21 equal to or lower than a current limit level. The output of the limiter 22 is inputted to the inverter output current target value section 23, and thus becomes an active current target value for the inverter output current ib.

The second subtractor 24 subtracts the inverter output current ib flowing actually, which is detected by the second current detector 35, from the inverter output current target value. Based on the resultant subtraction output, the current compensator 25 outputs compensation current for causing the inverter output current ib to approach the load current ia. This current output and the system voltage (load voltage) are added by the adder 26, and based on power obtained by the addition, the PWM signal generator 27 generates a PWM signal for controlling the bidirectional inverter 7.

In the proportional integral element section 16, (a) if (voltage target value−actual DC voltage value) is zero, the output power (active power) of the solar battery 2 and the storage battery 4, and the active power of the load power have the same magnitude, and thus are balanced. In this case, through feedback control by the inverter output current control unit 12, the bidirectional inverter 7 supplies output power having: the active current ib1 of the inverter output current ib one-fold proportional to (i.e., equal to) the active current ia1 of the load current ia; and the reactive current ib2 of the inverter output current ib equal to the reactive current ia2 of the load current ia.

In the proportional integral element section 16, (b) if (voltage target value−actual DC voltage value) is positive, the output power of the solar battery 2 and the storage battery 4 is smaller than the load active power, and therefore the inverter output current target value is set to be smaller (for example, 0.9 times) than the active current ia1 of the load current ia. In this case, through feedback control by the inverter output current control unit 12, the active current ib1 of the inverter output current ib is controlled to be proportional to and smaller than the active current ia1 of the load current ia, and the reactive current ib2 of the inverter output current ib is controlled to be equal to the reactive current ia2 of the load current ia. Thus, power that can be outputted by the bidirectional inverter 7 can be supplied, and through control by the control section 10, power corresponding to deficiency is supplied from the power system 8 to the load 9.

In the proportional integral element section 16, (c) if (voltage target value−actual DC voltage value) is negative, the actual DC voltage value is caused to approach the voltage target value by the proportional integral element section 16, and through feedback control by the inverter output current control unit 12, the bidirectional inverter 7 supplies output power having: the active current ib1 of the inverter output current ib one-fold proportional to (i.e., equal to) the active current ia1 of the load current ia; and the reactive current ib2 of the inverter output current ib equal to the reactive current ia2 of the load current ia.

The voltage target value for the smoothing capacitor 6 may be changed in proportional to AC voltage of the power system 8. This is effective in the case where, in reverse flow, the inverter output voltage is set to be as low as possible so as not to be lower than voltage needed for flowing current to the power system 8, to improve the inverter efficiency.

As described above, regarding the above (a) and (c), if the active power from the solar battery 2 and the storage battery 4 is equal to or greater than the active power of the load power, the amplitude of the active current ib1 of the inverter output current ib is made one-fold proportional to (i.e., equal to) the amplitude of the active current ia1 of the load current ia, and the reactive current ib2 of the inverter output current ib is made equal to the reactive current ia2 of the load current ia. Therefore, a ratio of active current and reactive current is the same between the load current ia and the inverter output current ib, and the power factor of the load current ia and the power factor of the inverter output current ib coincide with each other. The active current ib1 of the inverter output current ib is made proportional to the active current ia1 of the load current ia within the target amplitude (corresponding to load supply voltage and system voltage) for the smoothing capacitor 6. Therefore, harmonic current from the bidirectional inverter 7 is limited. In any of the cases (a) to (c), the reactive current ib2 of the inverter output current ib is equal to the reactive current ia2 of the load current ia.

In this case, even if there are a plurality of loads 9 including a load with a low power factor and a load with a high power factor, and it is desired to detect and control only the load with a low power factor, or even if there are a plurality of loads 9 including a load that needs to be supplied with power from a solar battery or a storage battery in a power outage state, and a load that need not be supplied with power in a power outage state, and it is desired to detect and control only the load that needs to be supplied with power in a power outage state, since the power factor of the load current ia and the power factor of the inverter output current ib as for the load 9 that needs to be controlled as described above coincide with each other, it is possible to supply stable power while swiftly and appropriately responding to change in the power factor of the load current ia. In addition, while harmonic current from the bidirectional inverter 7 is limited, the reactive currents ib2 and ia2 of the inverter output current ib and the load current ia are equal to each other, and thus reactive current is controlled so as not to flow from the power system 8 to the load 9. Therefore, it is possible to compensate reactive power while suppressing occurrence of harmonic current.

Operation of the inverter output current control unit 12 will be described with reference to FIG. 4. In chart (a) of FIG. 4, system voltage α is indicated by a broken line, system current ic (shown by β) flowing from the power system 8 to the load 9 when the inverter output current ib is zero is indicated by a thick line, and active current ic1 (shown by β1) and reactive current ic2 (shown by β2) of the system current ic are indicated by thin lines. In chart (b) of FIG. 4, inverter output current ib (shown by γ) flowing from the bidirectional inverter 7 to the load 9 is indicated by a thick line, and active current ib1 (shown by γ1) and reactive current ib2 (shown by γ2) of the inverter output current ib are indicated by thin lines. In this example, the active current ib1 of the inverter output current ib from the bidirectional inverter 7 is one-fold proportional to, i.e., equal to the active current ia1 of the load current ia, the reactive current ib2 of the inverter output current ib is equal to the reactive current ia2 of the load current ia, and both currents have completely the same waveform. Therefore, the power factor of the load current ia and the power factor of the inverter output current ib coincide with each other.

Figure 4:
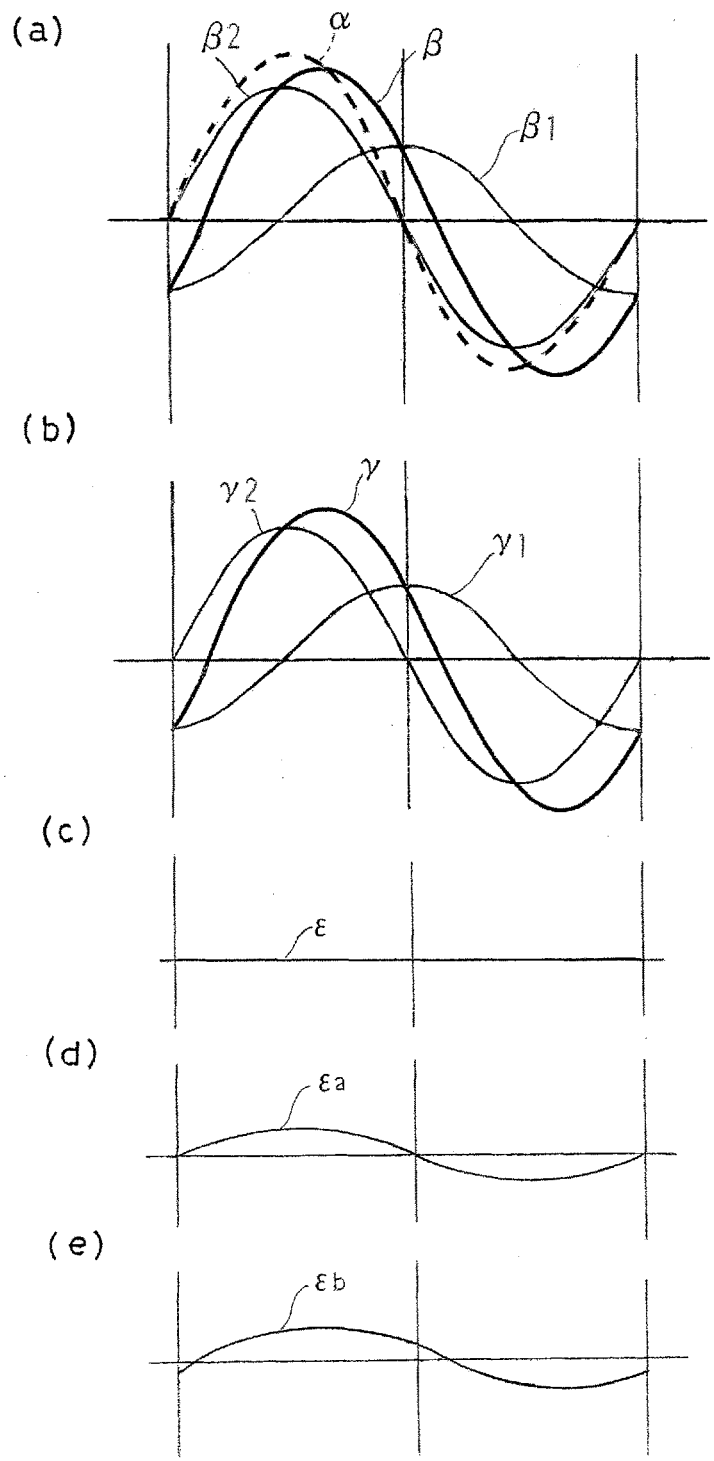
FIG. 4 is a characteristic diagram showing operation of the present system.

Chart (c) of FIG. 4 shows the case where the bidirectional inverter 7 flows the entirety of the load current ia. In this case, the system current ic (shown by ε) is zero. Chart (d) of FIG. 4 shows the case where the bidirectional inverter 7 flows the entirety of the reactive current ia2 of the load current ia, and a part of the active current ia1. In this case, the system current ic (shown by εa) becomes a part of the active current ia1 of the load current ia, and does not include the reactive current ia2. That is, in FIG. 2, ia=ib+ic is satisfied, and if ia2=ib2 is satisfied, reactive power compensation is performed, so that reactive current of the system current ic does not flow. Chart (e) of FIG. 4 shows the case where the bidirectional inverter 7 flows a part of the load current ia, so that the power factors of both currents do not coincide with each other, which case is not included in the scope of the present invention. In this case, the system current is (shown by εb) becomes a part of the active current ia1 of the load current ia and includes the reactive current ia2.

In the proportional integral element section 16 in FIG. 2, when (voltage target value−actual DC voltage value) is negative, if output power of the solar battery 2 and the storage battery 4, which is active power that can be outputted by the bidirectional inverter 7, is greater than active power of the load power, and surplus power is further generated by the solar battery 2 alone, the surplus power is charged into the storage battery 4 through control by the control section 10. That is, regarding charging of the storage battery 4, when the maximum value of the active current amplitude of the inverter output current ib can be caused to coincide with the maximum value of the active current amplitude of the load current ia, and DC power of the solar battery 2 is greater than the active power of the load 9 so that surplus power is generated, through control of the bidirectional converter 5 by the control section 10, the surplus power is charged in a state in which power can be stored into the storage battery 4.

A state in which power can be stored into the storage battery 4 refers to a state in which DC power from the solar battery 2 and DC power supplied from the power system 8 can be stored into the storage battery 4 based on a remaining capacity, a maximum capacity, a state of charge, and the like of the storage battery 4. For example, when output power of the solar battery 2 is smaller than the load active power as at midnight, power is purchased from the power system 8 and is charged into the storage battery 4.

Regarding discharging of the storage battery 4, for example, in the case where, as at midnight, output power of the solar battery 2 is smaller than active power of the load power and therefore DC power of the solar battery 2 is deficient, when the storage battery 4 can be discharged, DC power stored in the storage battery 4 is discharged to supply the power to the load 9 through control of the bidirectional converter 5 by the control section 10.

Regarding reverse flow, when output power of the solar battery 2 and the storage battery 4 is greater than active power of the load power so that surplus power is generated, if power can be reversely flowed to the power system 8, through control by the control section 10, DC power outputted from the solar battery 2 and the storage battery 4 is converted to AC power synchronized with AC power of the power system 8, and the resultant AC power is supplied to the power system 8. In this example, when the storage battery 4 has reached a power storage limit, charging of DC power of the solar battery 2 into the storage battery 4 is stopped and DC power of the solar battery 2 is reversely flowed to the power system 8.

Figure 5:
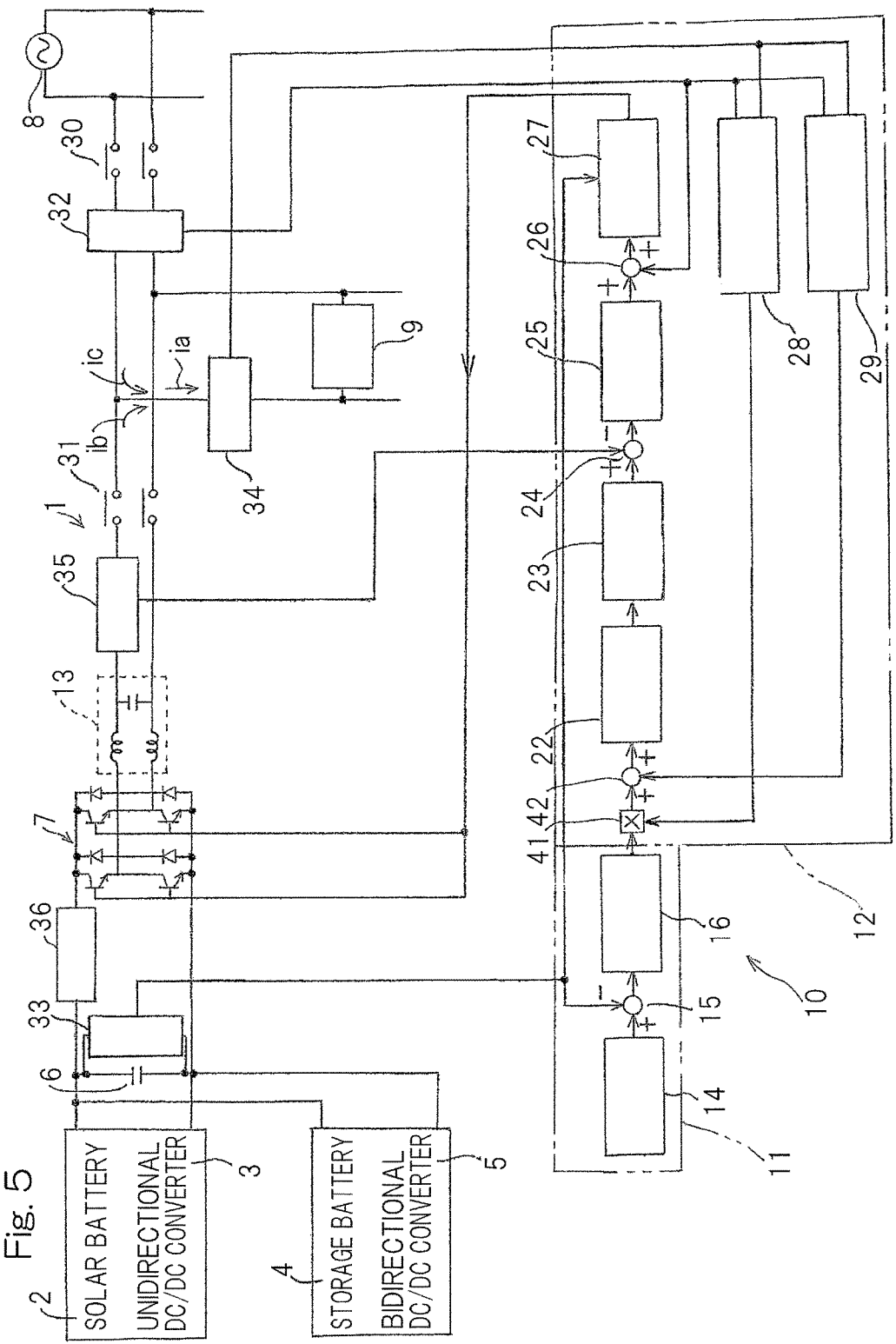
FIG. 5 is a block diagram showing a distributed power source system with a storage battery according to the second embodiment.

FIG. 5 shows the second embodiment. In the second embodiment, instead of the multiplier 21 in FIG. 2, a multiplier 41 and an adder 42 are provided. In addition, a load current active component detector 28 and a load current reactive component detector 29 are provided, which respectively detect the amplitude of the active current ia1 of the load current ia and the reactive current ia2 of the load current ia detected by the first voltage detector 32 and the first current detector 34. The load current active component detector 28 may be an effective value detector for the load current ia. The other configuration is the same as in the first embodiment.

In FIG. 5, in the inverter output current control unit 12, output of the proportional integral element section 16 and the active current ia1 of the load current ia from the load current active component detector 28 are multiplied by the multiplier 41. The output of the multiplier 41 and the reactive current ia2 itself of the load current ia from the load current reactive component detector 29 are added by the adder 42. In the second embodiment, since the load current ia is divided into an active component and a reactive component, more accurate detection can be performed for the load current ia, but the first embodiment in which the load current ia itself is multiplied by the multiplier 21 enables swifter control.

Thus, in the present invention, when active power supplied from the solar battery and/or the storage battery to the smoothing capacitor is equal to or greater than active power of the load power, the power factor of the inverter output current outputted from the bidirectional inverter is controlled so as to coincide with the power factor of the load current flowing to the load. Therefore, for a load that needs to be controlled, by causing the power factor of the inverter output current to coincide with the power factor of the load current, it becomes possible to supply stable power while swiftly and appropriately responding to change in the power factor of the load current, and compensate reactive current.

In the above embodiments, a single solar battery is used as the distributed power source. However, a plurality of solar batteries may be used, or besides a solar battery, a plurality of fuel batteries, engine-driven AC generators, or the like may be used.

In such a case, a fuel battery and a unidirectional DC/DC converter (for fuel battery) are used, and an engine-driven AC generator and a unidirectional AC/DC converter (for engine-driven AC generator) are used. Any of their generated powers is not reversely flowed. In the case of fuel battery, one DC side of the unidirectional DC/DC converter is connected to the fuel battery, and the other DC side thereof is connected to the smoothing capacitor connected to the DC side of the bidirectional inverter 7. In the case of engine-driven AC generator, the AC side of the unidirectional AC/DC converter is connected to the engine-driven AC generator, and the DC side thereof is connected to the smoothing capacitor connected to the DC side of the bidirectional inverter 7.

In the above embodiments, surplus power of the distributed power source is reversely flowed. However, the reverse flow may be omitted in the system.

The present invention is not limited to the embodiments described above, and various additions, modifications, or deletions may be made without departing from the gist of the invention. Therefore, these are construed as included within the scope of the present invention.

REFERENCE NUMERALS

1 . . . distributed power source system with storage battery
2 . . . distributed power source (solar battery)
3 . . . unidirectional converter (DC/DC converter)
4 . . . storage battery
5 . . . bidirectional converter (DC/DC converter)
6 . . . smoothing capacitor
7 . . . bidirectional inverter (DC/AC inverter)
8 . . . power system
9 . . . load
10 . . . control section
11 . . . target amplitude calculation unit
12 . . . inverter output current control unit
ia . . . load current
ia1 . . . active current of load current
ia2 . . . reactive current of load current
ib . . . inverter output current
ib1 . . . active current of inverter output current
ib2 . . . reactive current of inverter output current
ic . . . system current

What is claimed is:
1. A distributed power source system with a storage battery, comprising:

a distributed power source;

the storage battery;

a bidirectional inverter having a smoothing capacitor on a DC side thereof and configured to perform bidirectional conversion between DC power outputted from the distributed power source and/or the storage battery, and AC power interconnected to a commercial power system;

a unidirectional converter provided between the distributed power source and the bidirectional inverter and configured to perform DC conversion of DC power of the distributed power source;

a bidirectional converter provided between the storage battery and the bidirectional inverter and configured to perform bidirectional DC conversion of DC power of the storage battery; and a control section configured to control the distributed power source system, the distributed power source system supplying AC power to a load while being interconnected with the commercial power system, wherein the control section controls a power factor of inverter output current outputted from the bidirectional inverter so as to coincide with a power factor of load current flowing to the load, when active power supplied from the distributed power source and/or the storage battery to the smoothing capacitor is equal to or greater than active power of load power.

2. The distributed power source system with a storage battery as claimed in claim 1, wherein the control section includes:

a target amplitude calculation unit configured to calculate a deviation between a voltage command value, and a DC voltage value detected at the smoothing capacitor and depending on active power of the distributed power source and/or the storage battery and on output power of the bidirectional inverter, and to generate a target amplitude for active current of the inverter output current outputted from the bidirectional inverter; and an inverter output current control unit configured to perform feedback control to make the active current of the inverter output current proportional to active current of the load current flowing to the load within the target amplitude.

3. The distributed power source system with a storage battery as claimed in claim 1, wherein when the active power from the distributed power source and/or the storage battery is smaller than the active power of the load power, the control section performs control so as to make active current of the inverter output current smaller than active current of the load current, and to make reactive current of the inverter output current equal to reactive current of the load current.

4. The distributed power source system with a storage battery as claimed in claim 1, wherein when a maximum value of an active current amplitude of the inverter output current can be caused to coincide with a maximum value of an active current amplitude of the load current, and DC power of the distributed power source is greater than active power of the load power so that surplus power is generated, the control section controls the bidirectional converter so as to charge the storage battery with the surplus power that can be charged therein.

5. The distributed power source system with a storage battery as claimed in claim 4, wherein when the surplus power is generated, the control section performs control so as to reversely flow DC power that can be reversely flowed to the commercial power system.

6. The distributed power source system with a storage battery as claimed in claim 1, wherein the distributed power source is a single power source or a plurality of power sources, at least including a solar battery.

* * * * *